United States Patent
Ho et al.

(10) Patent No.: US 11,846,451 B2
(45) Date of Patent: *Dec. 19, 2023

(54) MULTI-STAGE FALLING PARTICLE RECEIVERS

(71) Applicants: National Technology & Engineering Solutions of Sandia, LLC, Albuquerque, NM (US); CSIRO, Canberra (AU)

(72) Inventors: Clifford K. Ho, Albuquerque, NM (US); Jin-Soo Kim, Corlette (AU); Apurv Kumar, Palmerston (AU)

(73) Assignees: National Technology & Engineering Solutions of Sandia, LLC, Albuquerque, NM (US); Commonwealth Scientific and Industrial Research Organisation, Acton (AU)

( * ) Notice: Subject to any disclaimer, the term of this patent is extended or adjusted under 35 U.S.C. 154(b) by 226 days.

This patent is subject to a terminal disclaimer.

(21) Appl. No.: 17/158,745

(22) Filed: Jan. 26, 2021

(65) Prior Publication Data

US 2021/0164697 A1 Jun. 3, 2021

Related U.S. Application Data

(63) Continuation of application No. 16/385,993, filed on Apr. 16, 2019, now Pat. No. 10,914,493.

(60) Provisional application No. 62/658,340, filed on Apr. 16, 2018.

(51) Int. Cl.
*F24S 70/16* (2018.01)
*F24S 60/00* (2018.01)
*F24S 30/00* (2018.01)
*F24S 25/40* (2018.01)

(52) U.S. Cl.
CPC .............. *F24S 70/16* (2018.05); *F24S 25/40* (2018.05); *F24S 30/00* (2018.05); *F24S 60/00* (2018.05)

(58) Field of Classification Search
CPC .......... F23N 1/005; F23N 1/007; F23N 5/206; F23N 5/245; F23N 2225/16; F23N 2231/04; F23N 2231/06; F23N 2235/14; F16K 31/0644; F23K 2900/05001
See application file for complete search history.

(56) References Cited

U.S. PATENT DOCUMENTS 3,908,632 A * 9/1975 Poulsen .................. F24S 80/20
34/589
4,055,948 A * 11/1977 Kraus ..................... F03G 6/067
324/624

(Continued)

FOREIGN PATENT DOCUMENTS

DE 10 2016 209 817 A1 12/2017

*Primary Examiner* — David J Laux
(74) *Attorney, Agent, or Firm* — Daniel J. Jenkins

(57) ABSTRACT

The present disclosure is directed to multi-stage falling particle receivers and methods of falling particle heating. As the particles fall through the receiver, the particles are periodically collected and released by flow retarding devices. The periodic catch-and-release of the particles falling through the receiver reduces particle flow dispersion, increases particle opacity and solar absorption, and reduces erosion and damage to surfaces caused by direct particle impingement.

21 Claims, 9 Drawing Sheets

(56) References Cited

U.S. PATENT DOCUMENTS

| | | | | |
|---|---|---|---|---|
| 4,212,292 | A * | 7/1980 | Reinert | F24S 10/80 126/633 |
| 4,338,919 | A * | 7/1982 | Hwang | F24S 80/20 126/640 |
| 8,109,265 | B1 * | 2/2012 | Kolb | F24S 20/20 126/714 |
| 9,347,690 | B2 * | 5/2016 | Ma | F28D 13/00 |
| 9,377,246 | B2 * | 6/2016 | Jeter | F24S 20/20 |
| 9,651,313 | B2 * | 5/2017 | Trainham | F03G 6/00 |
| 9,732,986 | B2 * | 8/2017 | Al-Ansary | F24S 20/20 |
| 9,829,217 | B2 * | 11/2017 | Maryamchik | F03G 6/067 |
| 9,939,178 | B2 * | 4/2018 | Maryamchik | F24S 40/80 |
| 10,107,523 | B2 * | 10/2018 | Krause | F24S 70/16 |
| 10,422,552 | B2 * | 9/2019 | Ma | F24S 80/20 |
| 10,502,459 | B1 * | 12/2019 | Armijo | F24S 90/00 |
| 10,508,834 | B1 * | 12/2019 | Ho | F24S 21/00 |
| 10,578,341 | B2 * | 3/2020 | Xiao | F24S 20/20 |
| 10,724,765 | B2 * | 7/2020 | Arjomandi | B01J 19/127 |
| 10,914,493 | B2 * | 2/2021 | Ho | F24S 25/40 |
| 11,326,810 | B2 * | 5/2022 | Ho | F24S 90/00 |
| 2009/0277443 | A1 * | 11/2009 | Jukkola | F03G 6/065 126/643 |
| 2011/0209475 | A1 * | 9/2011 | Jeter | F28D 20/0056 60/641.11 |
| 2013/0068217 | A1 * | 3/2013 | Al-Ansary | F24S 10/80 126/714 |
| 2013/0228163 | A1 * | 9/2013 | Wait | B01J 19/24 126/714 |
| 2013/0257056 | A1 * | 10/2013 | Ma | F28D 20/0056 126/714 |
| 2013/0284163 | A1 * | 10/2013 | Flamant | B01J 8/32 126/714 |
| 2015/0316328 | A1 * | 11/2015 | Trainham | F28D 17/005 165/10 |
| 2016/0097564 | A1 * | 4/2016 | Maryamchik | F24S 50/00 126/643 |
| 2017/0145324 | A1 | 5/2017 | Kodama et al. | |
| 2017/0159975 | A1 * | 6/2017 | Krause | C04B 35/18 |
| 2017/0191697 | A1 * | 7/2017 | Xiao | F24S 20/20 |
| 2017/0314817 | A1 | 11/2017 | Al-Ansary et al. | |
| 2018/0119993 | A1 * | 5/2018 | De Riccardis | F24S 23/70 |

* cited by examiner

MULTI-STAGE FALLING PARTICLE RECEIVERS

CROSS-REFERENCE TO RELATED APPLICATIONS

This application is a Continuation of and claims priority to U.S. Non-Provisional patent application Ser. No. 16/385,993, filed Apr. 16, 2019, entitled "Multi-Stage Falling Particle Receivers," and U.S. Provisional Patent Application Ser. No. 62/658,340, filed Apr. 16, 2018, entitled "Multi-Stage Falling Particle Receivers," and is related to U.S. Provisional Patent Application Ser. No. 62/145,136, "Falling Particle Solar Receivers," filed on Apr. 9, 2015, and to U.S. patent application Ser. No. 15/095,738, "Falling Particle Solar Receivers," filed on Apr. 11, 2016, the disclosures of which are incorporated by reference herein in their entireties.

STATEMENT CONCERNING FEDERALLY SPONSORED RESEARCH

The United States Government has rights in this invention pursuant to Contract No. DE-AC04-94AL85000 between the United States Department of Energy and Sandia Corporation, and pursuant to Contract No. DE-NA0003525 between the United State Department of Energy and National Technology and Engineering Solutions of Sandia, LLC, for the operation of the Sandia National Laboratories.

The Australian Government has rights in this invention as partial funding for this work was provided to the Commonwealth Scientific and Industrial Research Organisation by the Australian Government.

FIELD OF THE INVENTION

The present disclosure is generally directed to solar energy, and more particularly directed to falling particle concentrated solar receivers.

BACKGROUND OF THE INVENTION

Solar power systems offer much promise for clean energy, with few, or zero, carbon emissions. These systems collect incident sunlight and convert this sunlight into a usable form of power, such as heat or electricity. Solar energy offers a clean, inexhaustible, sustainable solution to energy demands and has the potential to supply a very significant fraction of U.S. and global electricity consumption. While the U.S. and global solar power potential is known to be immense, solar power systems have not been economically competitive without government support, to date. Challenges remain to devise solar technologies that can lower installation costs, increase power output, and lower the marginal cost per unit energy produced, for a lower levelized cost of energy.

Emerging solar power systems include particle solar receivers that heat particles for energy conversion, energy storage, thermochemical processes, electricity production, and process heating. However, previously disclosed processes and systems are either not efficient in capturing solar energy to heat particles or require complex structures or fluidization, which increase costs and parasitic electricity consumption.

The particle receivers utilize solid particles as the heat transfer medium to absorb the incident concentrated solar energy. One type of receiver uses a freely falling particle curtain directly exposed to concentrated solar energy through an aperture open between the particles and sunlight to heat the particles. However, there are some inherent drawbacks with the free-falling particles, such as the decreased volume fraction and opacity of the falling particles caused by gravitational acceleration that increases downward velocity and dispersion and reduces the residence time of the particles.

Low particle volume fraction increases the transmittance of the particle curtain. Additionally, solar energy not absorbed by the particles is lost either by being reflected back out the receiver aperture to the outside surroundings or by being absorbed by the walls and materials other than the particles. This problem is affected by a combination of multiple factors including particle falling height, flow rate, and particle size. Flow instability of the particle curtain is an additional issue with the free-falling particle receiver. As the particles fall, a stable and dense initial clustered formation is perturbed and transforms into a wider and unstable particle curtain, creating undesired impact on particle hydrodynamics and heat transfer. Uneven heating across the falling particle curtain is one of the main drawbacks of a free-falling particle receiver.

The need remains, therefore, for falling particle solar receivers and methods of falling particle heating to address these and other limitations and that efficiently capture solar energy to heat particles for energy conversion, storage, and thermal processes.

SUMMARY OF THE INVENTION

The disclosure is directed to multi-stage falling particle receivers and methods of falling particle heating. As the particles fall through the receiver, the particles are periodically collected in a trough or funnel, where they are slowly released again.

According to an embodiment of the disclosure, a solar receiver is disclosed that includes a housing comprising at least one opening for receiving concentrated solar irradiance and a front wall and a rear wall, one or more openings in the housing for receiving irradiance, and a flow retarding system comprising one or more flow retention devices disposed within the housing for receiving and releasing particles as the particles fall through the solar receiver.

According to an embodiment of the disclosure, a solar heating method is disclosed that includes providing particles to a solar receiver and collecting and releasing particles in one or more flow retarding devices as the particles fall through the solar receiver and are heated by solar irradiance.

An advantage of the disclosed system and method is that it reduces the particle velocity and amount of vertical dispersion that a free-falling particle curtain experiences due to gravitational acceleration.

Another advantage is that the multistage system increases particle flow stability and reduces the impact of wind and chance of dust formation.

Another advantage of the disclosure is that the collection troughs can be used to mix the particles to enhance heat transfer and uniformity of the particle temperatures as they fall through the receiver.

Another advantage over a large array of continuous discrete obstructions is that the present disclosure uses less material to slow down the particles, which is beneficial for cost, repair, and maintenance, and the collection troughs can be positioned so that they are not within the direct irradiance.

Another advantage is that our invention is designed to cause falling particles to impinge on other particles that have accumulated in the trough, funnel, or ledge below (rather than impinge on the walls or surfaces of the trough, funnel, or ledge themselves) when being collected and slowed down, which protects surfaces from erosion and damage. The accumulation of particles in the trough, funnels, or ledges can be controlled actively (motorized) or passively (gravimetric counterweights, springs, variable slot apertures), as described in the application.

Another advantage is that in some embodiments, collection troughs can also be designed to be hidden behind the falling parting curtain to avoid direct exposure to the concentrated solar energy.

Another advantage is that our invention enables variable particle mass flow rate while still maintaining the desired high opacity. In previous systems that use a continuous array of porous structures, if the particle flow rate is lower than the design point, the mesh or porous structures will be exposed to direct irradiance since the particle flow will be insufficient to cover all the obstructions. If the particle flow is greater than the design point, particles will begin to waterfall over the leading edge of the top row of obstructions, and there will be significant reduction in the opacity of the waterfalling particles due to free-fall acceleration and dispersion. Our invention can be designed to handle a wide range of flow rates and still perform the periodic catch-and-release behavior to reduce downward particle velocities and increase opacity of the particle curtain.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

The figures depict embodiments of the present invention for purposes of illustration only and are not necessarily drawn to scale. One skilled in the art will readily recognize from the following discussion that alternative embodiments of the structures and methods illustrated herein may be employed without departing from the principles of the invention described herein.

DETAILED DESCRIPTION OF THE INVENTION

Figure 1A:
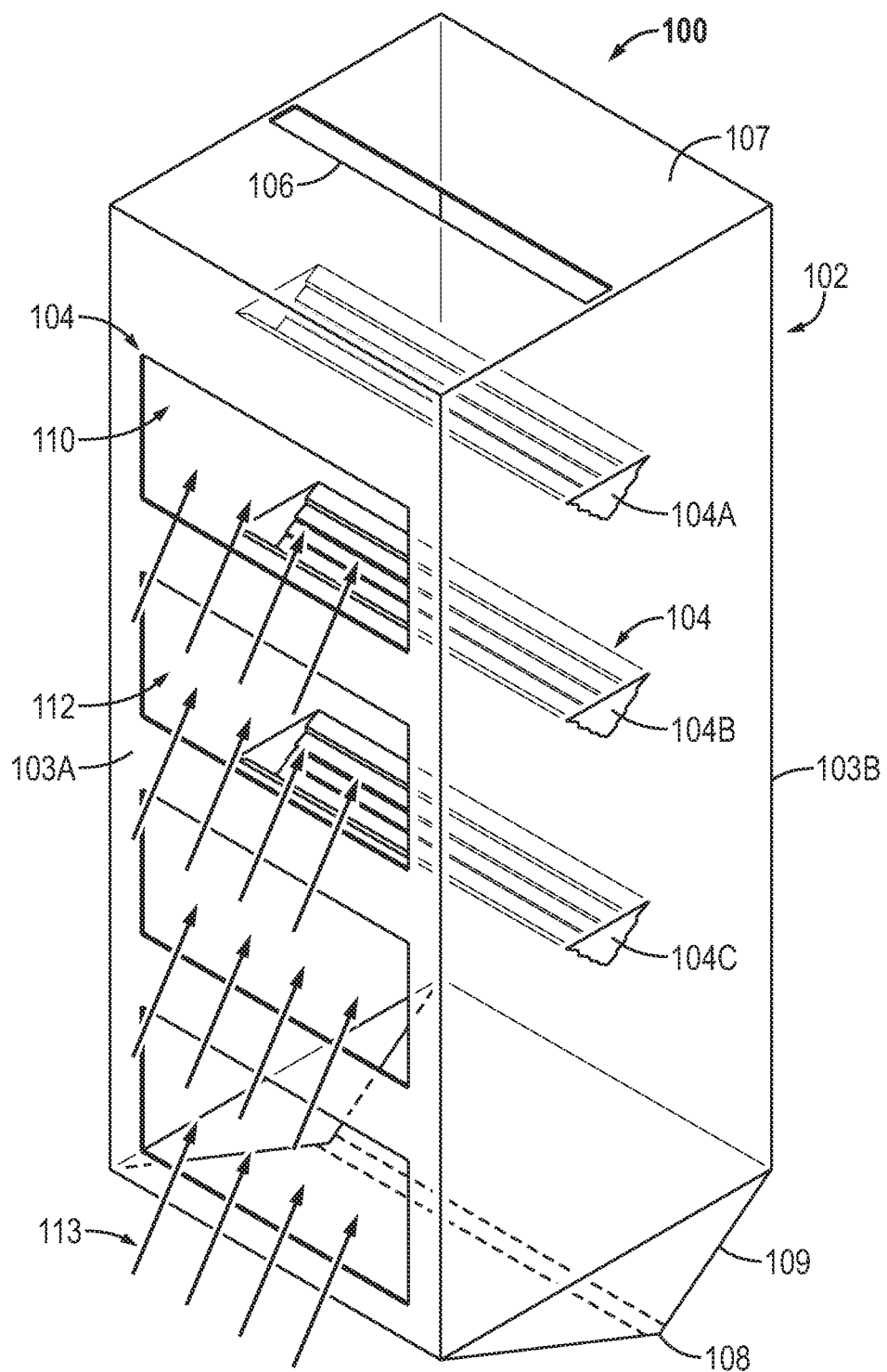
FIG. 1A is a perspective view of a multi-stage falling particle receiver according to an embodiment of the disclosure.

The present disclosure is directed to multi-stage falling particle receivers and methods of falling particle heating. As the particles fall through a falling particle solar receiver (receiver), the particles are periodically collected and released from rest (near-zero downward velocity) through the receiver by a flow retarding system that includes one or more catch-and-release or flow retarding devices that collect and release the particles as they continue to flow through the receiver. In various embodiments, the flow retarding system may include one or more flow retarding devices. In some embodiments the flow retarding system may include three or more flow retarding devices. In yet other embodiments, the flow retarding system may include between 10 and 90 flow retarding devices determined by factors including, but not limited to receiver cavity size, particle flow rate and irradiance.

The periodic collection and release prevent dispersion and acceleration as they fall through the receiver cavity and are heated by concentrated sunlight. For example, periodic collection and release in large-scale solar receiver systems (receiver size ~10-20 m) can prevent increased vertical and horizontal dispersion as the particles accelerate under gravity. In addition, the periodic collection and release reduces vertical particle dispersion that may lead to increased light transmittance through the particles, and horizontal dispersion may lead to particle loss through the aperture. Both vertical and horizontal dispersion cause increased heat loss resulting in decreased receiver performance.

In various embodiment, the flow retarding device may be funnels or troughs, ledges, grooves, wedges, or other structures or surfaces and combinations thereof that collect, retard and release the particles falling through the receiver under gravity. The flow retention devices are housed in a solar receiver that includes a housing, one or more openings in the housing for receiving irradiance or sunlight. In an embodiment, the flow retention devices are one or more troughs disposed within the housing for receiving and discharging particles as the particles fall through the solar receiver. The one or more openings may be slots, holes or other passages of variable sizes that allow for the release of the particles. In another embodiment, the flow retarding devices may be one or more tilted or inclined ledges or surfaces that collect and release the falling particles as the particles overfill the device (creating a "waterfall" effect). In yet another embodiment, the flow retarding device may be any two or more of the above disclosed devices.

The present disclosure is further directed to solar particle heating methods that include collecting, retarding and releasing, which can be collectively referred to as "retarding" particles as they fall through a solar receiver. The particles may be retarded one or more times as they fall through the receiver. The particles are retarded to reduce vertical particle dispersion that may lead to increased light transmittance through the particles, and to reduce horizontal dispersion may lead to particle loss through the aperture.

In various embodiments, the flow retention devices may have no or one or more openings. An opening is for this disclosure an opening other than the top opening for receiving falling particles. As such, in some embodiments, some flow retention devices include no openings so that collected particles "spill out" of the top opening. As such, in some other embodiments, the flow retention devices include side and/or a bottom opening for releasing particles. The openings are sized for the flow rate so that the particles are retained within the flow retention devices for some amount of time greater than zero before being released. In both embodiments, there is some accumulation of particles for some predetermined amount of time based on flow rate by the flow retention devices. For example, troughs having no openings accumulate particles until the particle level reaches a height in the trough that allows particles to spill out of the trough. In another example, particles accumulate on ledges to a predetermined amount before the particles spill off of the ledges. For troughs with openings, the particles accumulate in the troughs until the particles are released through the openings. One or more openings may be passively or actively controlled to adjust the size of the openings, such as for example passively adjusted by collected weight of particles or actively adjusted by actuators and/or other mechanical devices by an operator based on factors including, but not limited to flow rate, particle characteristics and irradiance.

In an embodiment, a series of particle collection troughs or other flow retention devices may be placed inside a receiver to collect the particles at intermittent intervals before the particles can accelerate and disperse too much. In another embodiment, one or more particle collection troughs may be used. The receiver can be comprised of a single aperture or multiple apertures to accommodate various sections of the particle flow as defined by the troughs. By aiming heliostat beams through multiple apertures, direct irradiance on the troughs (which can be placed in between the apertures) can be minimized to prevent overheating of the troughs. Some amount of incident light on the troughs may actually be good to heat the particles, and the troughs can be transparent or porous to allow light to heat the particles directly. In some embodiments, retarding troughs can be protected from direct irradiance by overflowing particles that flow over the edge facing incident concentrated solar energy, in other words, the waterfall of particles over the edge block/absorb the sunlight from the troughs.

The collection troughs can be designed to accommodate variable particle mass flow rates. The objective is to decelerate the particles before they are released again. If the trough contains just a single aperture at the bottom, the particle mass flow is prescribed by the aperture size. If the particle flow is less than the capacity of the aperture, then the particles will flow through the open aperture without significant deceleration. If the particle mass flow is greater than the capacity through the aperture, then the particles will accumulate and overfill the trough. Particles that impinge and flow over the mound above the trough will also not be decelerated to the fullest extent. In an embodiment, the troughs may include vertical slots that enable variable particle mass flow rates to be collected and released from a near-zero vertical velocity. In other embodiments, variable particle flow rates can be accommodated by designing the retarding troughs to allow one-side overflowing, creating a waterfall effect.

The troughs may mix the particles to enhance heat transfer and provide uniformity of the particle temperatures as they fall through the receiver. The collection troughs can be opaque, or they can be transparent or porous to allow direct heating of the particles by incident light. In an embodiment, the collection troughs can be positioned so that they are not within the direct irradiance. The aperture size of the collection troughs can be fixed, actively controlled, or passively controlled to enable variable mass flow rates of particles to be released from rest or near rest from each trough. In other embodiments including overflowing troughs, when overflowing is designed to occur on the solar irradiance side, the collection troughs can be efficiently protected from solar irradiance by the overflowing particles. The troughs can be designed to accommodate variable particle mass flow rates while maintaining a high particle curtain opacity. In contrast, with continuous discrete obstructions, only a small range of particle mass flow rates can be accommodated.

Computer modeling has shown that excessive vertical and horizontal dispersion is mitigated as a result of the flow retention devices, such as periodic trough collectors. As the particles fall, a high opacity of the particle curtain is desired to intercept the incident sunlight. The multistage system increases the particle opacity.

Other embodiments provide for various arrangements and staggering of the flow retention devices through the receiver. The angle of the troughs can be symmetric or skewed toward one size, and the location of the troughs can be located anywhere within the receiver or against the back wall to mitigate particle loss and the impacts of wind.

The present disclosure if further directed to methods for heating particles falling within a multi-stage falling particle receiver. As the particles fall through the receiver, the particles are periodically collected and released, preventing further dispersion and acceleration as they fall through the cavity of the receiver. This is important, especially in large-scale systems (receiver size ~10-20 m), to prevent increasing vertical dispersion as the particles accelerate under gravity, which leads to increased light transmittance through the particles and horizontal dispersion, which may lead to particle loss through the aperture.

Figure 1B:
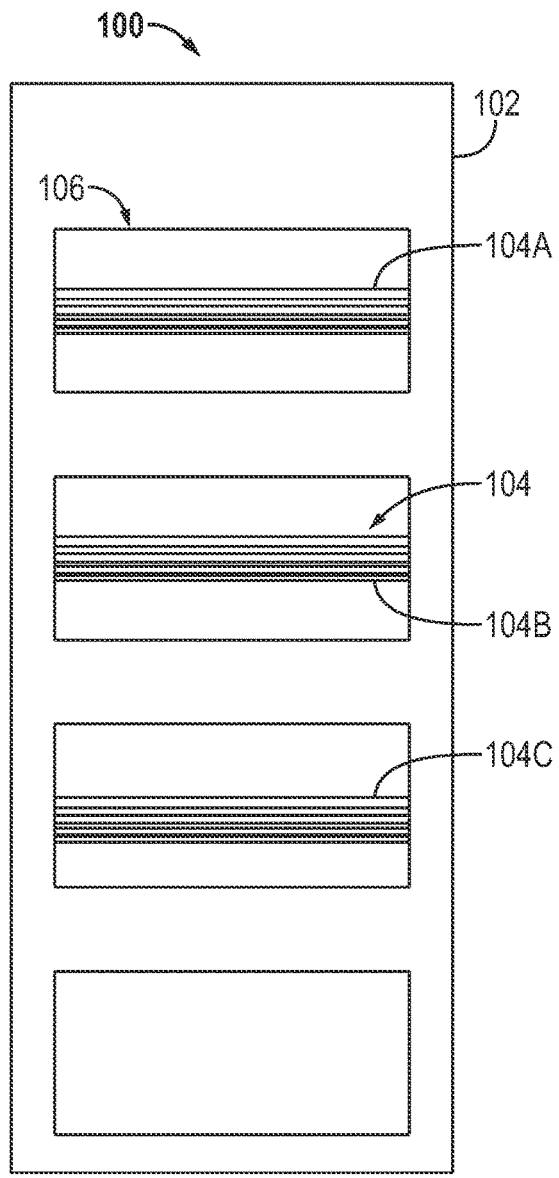
FIG. 1B is a front view of the multi-stage falling particle receiver of FIG. 1A.
Figure 1C:
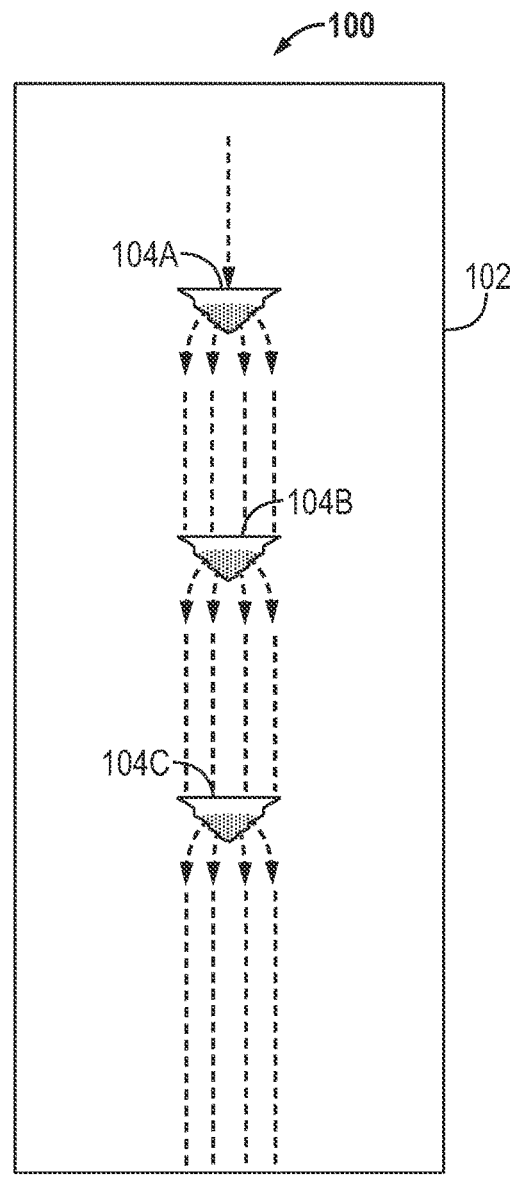
FIG. 1C is a side view of the multi-stage falling particle receiver of FIG. 1A.
Figure 2A:
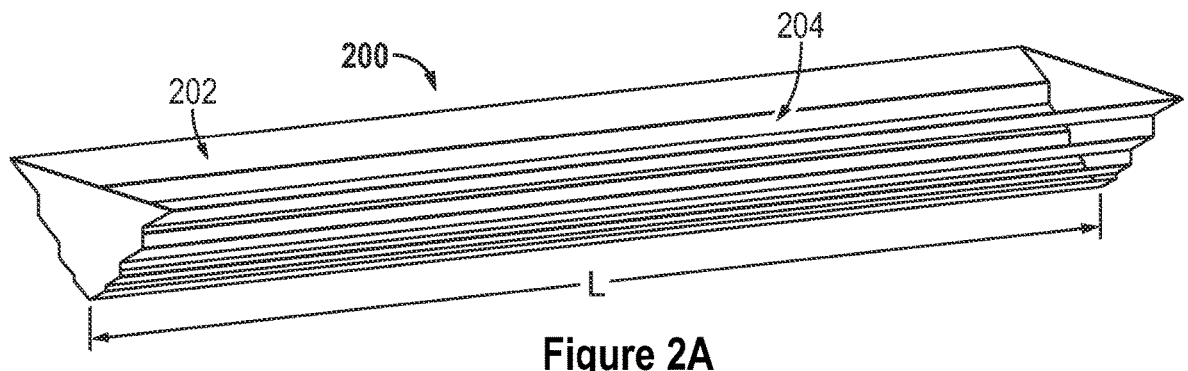
FIG. 2A is a perspective view of a trough according to an embodiment of the disclosure.
Figure 2B:
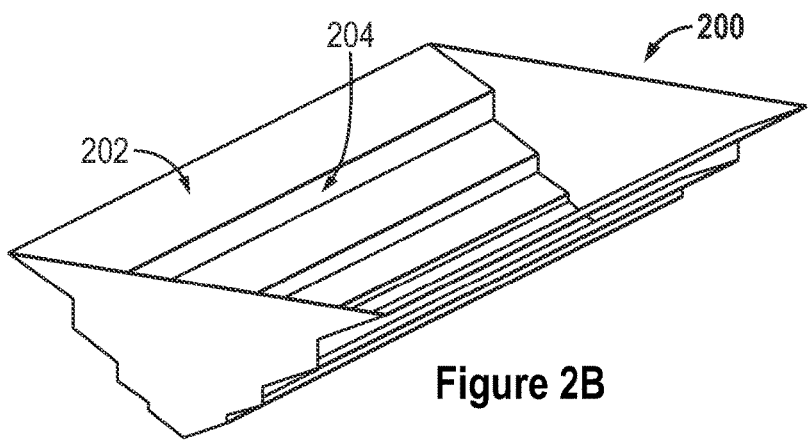
FIG. 2B is a top perspective view of the trough of FIG. 2A.
Figure 2C:
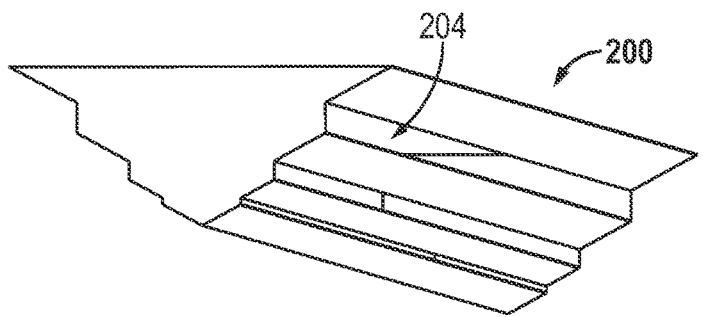
FIG. 2C is a bottom perspective view of the trough of FIG. 2A.
Figure 2D:
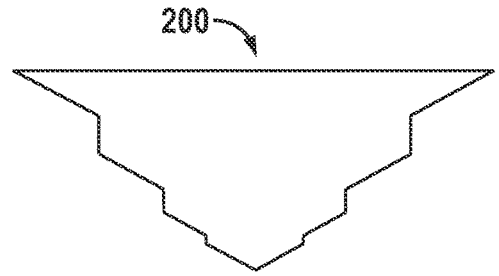
FIG. 2D is a side view of the trough of FIG. 2A.

FIGS. 1A-1C show different views of a multi-stage falling particle receiver (receiver) 100 according to an embodiment of the disclosure. As can be seen in FIGS. 1A-1C, the receiver 100 includes a housing 102 and a flow retarding system 104 disposed therewithin. The housing 102 includes a front panel 103A and a rear panel 103B. The housing 102 further includes an inlet 106 disposed within a housing top structure 107 and an outlet 108 disposed in a collection bin 109 in fluid communication to an internal chamber or cavity 110. The housing 102 further includes windows, apertures or openings 112 in the front panel 103A that allow directed, concentrated solar irradiance 113 to enter the cavity 110 and heat particles (not shown) falling therethrough. The concentrated solar irradiance 113 is from a solar source (not shown), such as a plurality of mirrors. In this exemplary embodiment, the front panel 103 includes four openings 112 that allow concentrated solar irradiance 113 to enter the cavity 110, and those openings 112 are separated by portions of the front panel 103 arranged to block the concentrated solar irradiance 113 from impinging on the flow retarding devices 104. FIG. 1B shows a frontal view wherein the flow retarding system 104 is visible, however, it should be noted that as seen from the perspective of the angle of irradiance of sunlight into the receiver, the flow retarding system 104 would be not visible as it would be blocked by portions of the front panel 103A In other embodiments, the receiver 100 may include one or more openings that may or may not be arranged within the front panel to block solar irradiance from impinging on the flow retarding devices.

The flow retarding system 104 retards particles falling through the receiver 100. In this exemplary embodiment, the flow retarding system 104 includes three flow retarding devices 105, respectively referred to as troughs 104A, 104B and 104C. In another embodiment, the receiver 100 may include one or more flow retarding devices. In yet another embodiment, the receiver 100 may include two or more flow retarding devices.

In this embodiment, the flow retarding devices 104 are funnels or troughs 104. The troughs 104 collect and retain the falling of particles for a predetermined amount of time, and then release and allow the particles to continue to fall. In such a manner, the particles fall is retarded. As the particles fall and horizontally (measured from the front or opening side of the receiver to the opposing back of the receiver) disperse, the particles are collected by the trough and released in a curtain, veil or other shape that has a predetermined horizontal length. In such a manner, the falling particle dispersement can be corrected to a predetermined width. In an embodiment, the predetermined width is the same as the initial width the particle curtain has as the particles enter the chamber 110. In another embodiment, the predetermined width is less than or greater than the initial width the particle curtain has as it enters the chamber 110. In such a manner, the particle curtain width can be controlled to accommodate the spatially non-uniform solar flux distribution entering the receiver.

The troughs 104 are disposed within the housing 102 and vertically arranged so that the most upper trough 104A receives particles from the inlet 106, and outputs or releases those particles to a next in sequence or second trough 104B disposed underneath thereof. The next in sequence, trough 104B thereafter releases those collected particles to a third trough 104C, which releases those particles to the collection bin 109 or other particle collection device or system located proximate the bottom of the receiver 100.

In such a manner, particles falling into the upper most or first trough 104A receive irradiance, and the particles falling between the troughs and from the third trough also receive irradiance. In other embodiments, two or more openings 112 may be placed to allow irradiance to be received by particles at two or more locations in the falling particle arrangement. A single aperture could also be used with multiple heliostat aim points to heat the particles falling between collection troughs.

FIGS. 2A-D show a trough 200 according to an embodiment of the disclosure. As can be seen in FIGS. 2A-2D, the trough 200 include apertures, slots or openings 204. In this exemplary embodiment, the trough 200 includes a top opening 202 for receiving falling particles, and a plurality of apertures, slots or openings 204 for releasing collected particles. In this exemplary embodiment, the trough 200 includes six openings 204. In other embodiments, the trough 200 may include one or more openings 204. In this exemplary embodiment, the openings are horizonal slots having a length L approximately equal to the length of the inlet 106.

The size of the slot apertures can be varied to accommodate more mass release as the slots progress towards the top. The configuration and size of the slot apertures may be optimized to create particle release configurations that take advantage of volumetric heating. Furthermore, the collective opening area is sized so that the total volume release is greater than the mass flow into the receiver. In such a manner, a trough cannot overflow from not being able to release more than the received volume of flow. In addition, the spacing of the slots from the front (side closest to impinging light) to the back (side farthest from impinging light) can be varied so as to maintain the width of the particle flow curtain, increase or decrease the width. Furthermore, the distance between the troughs can be varied to optimize the heating of the particles in conjunction with the irradiance distribution from the heliostat aiming strategy. In particular, the troughs are separate components that do not form a continuous retention of particle falling flow but provide for a discontinuous catch-and-release system of retardation.

Referring back to FIG. 1C, it can be seen how particles (indicated by the mass collected in the troughs and dashed lines) collect and are retained for a period of time greater than zero in the troughs 104 and are released from the openings to continue to fall within receiver 102.

Figure 3A:
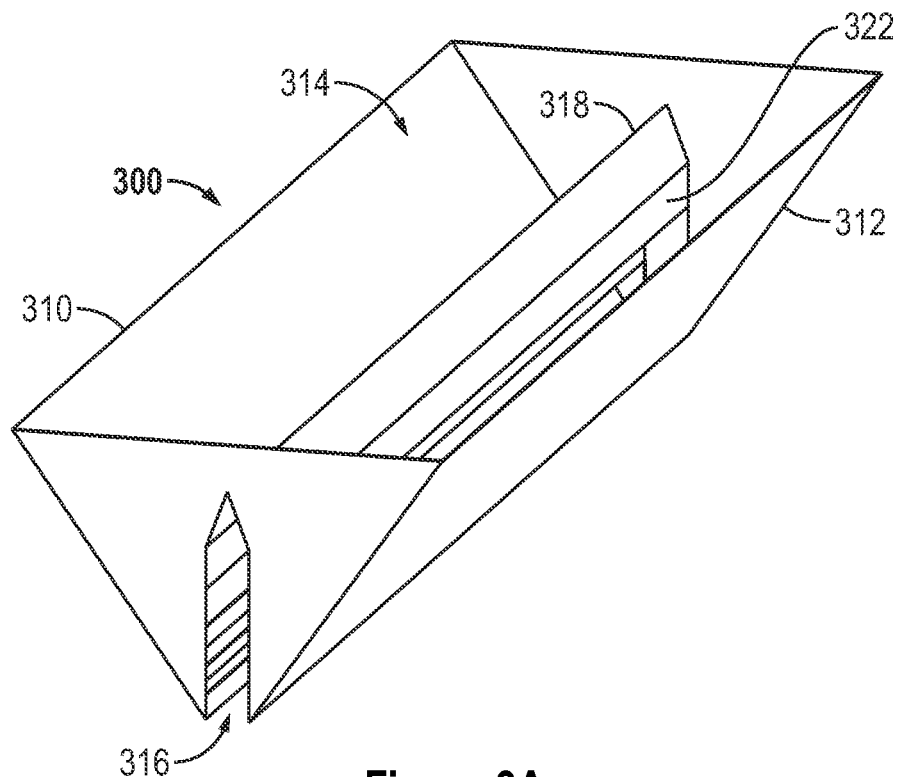
FIG. 3A shows another embodiment of a trough particle flow retarding device according to an embodiment of the disclosure.
Figure 3B:
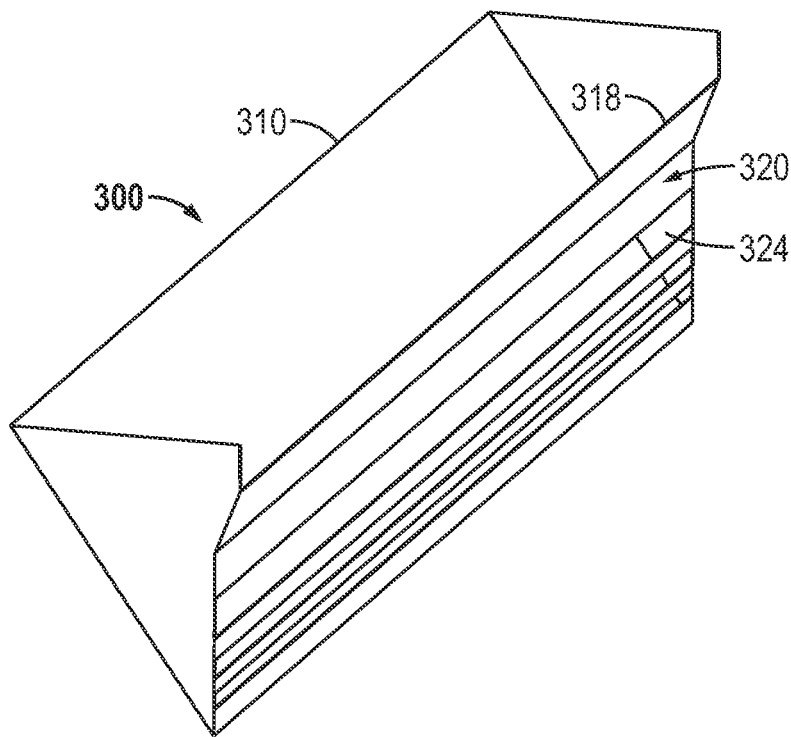
FIG. 3B is a cross-sectional view of the trough particle flow retarding device of FIG. 3A.

FIGS. 3A and 3B show another trough 300 according to an embodiment of the disclosure. FIG. 3B is a cross-sectional view of FIG. 3A and is a mirror image of the opposing section. As can be seen in FIGS. 3A and 3B, the trough 300 includes a front panel 310 and a rear panel 312. The trough 300 further includes a top opening 314 for receiving falling particles, and a bottom opening 316 for discharging or releasing particles. The trough 300 also includes a central divider 318 that directs falling particles either towards the front panel 310 or the rear panel 312.

The central divider 318 includes a front divider panel 320 and a rear divider panel 322. As can be seen in FIG. 3B, the front divider panel 320 includes slots or openings 324 that allow particles directed towards the front panel 310 to accumulate and be released into the bottom opening 316 for discharge. The rear divider panel 322 mirrors the front divider panel 320. This particular embodiment causes the particles to be released through a single opening, creating a single particle curtain. If the particle flow rate exceeds the discharge capacity of the bottom slot of panel 320, the particles will further accumulate and discharge through the slot above the bottom slot of panel 320, and so on. The height and number of the slot openings in panel 320 can be variable and designed to handle any range of expected particle flow rates of the system. In one embodiment, there could be as few as one slot opening in front divider panel 320 and rear divider panel 322.

Figure 4:
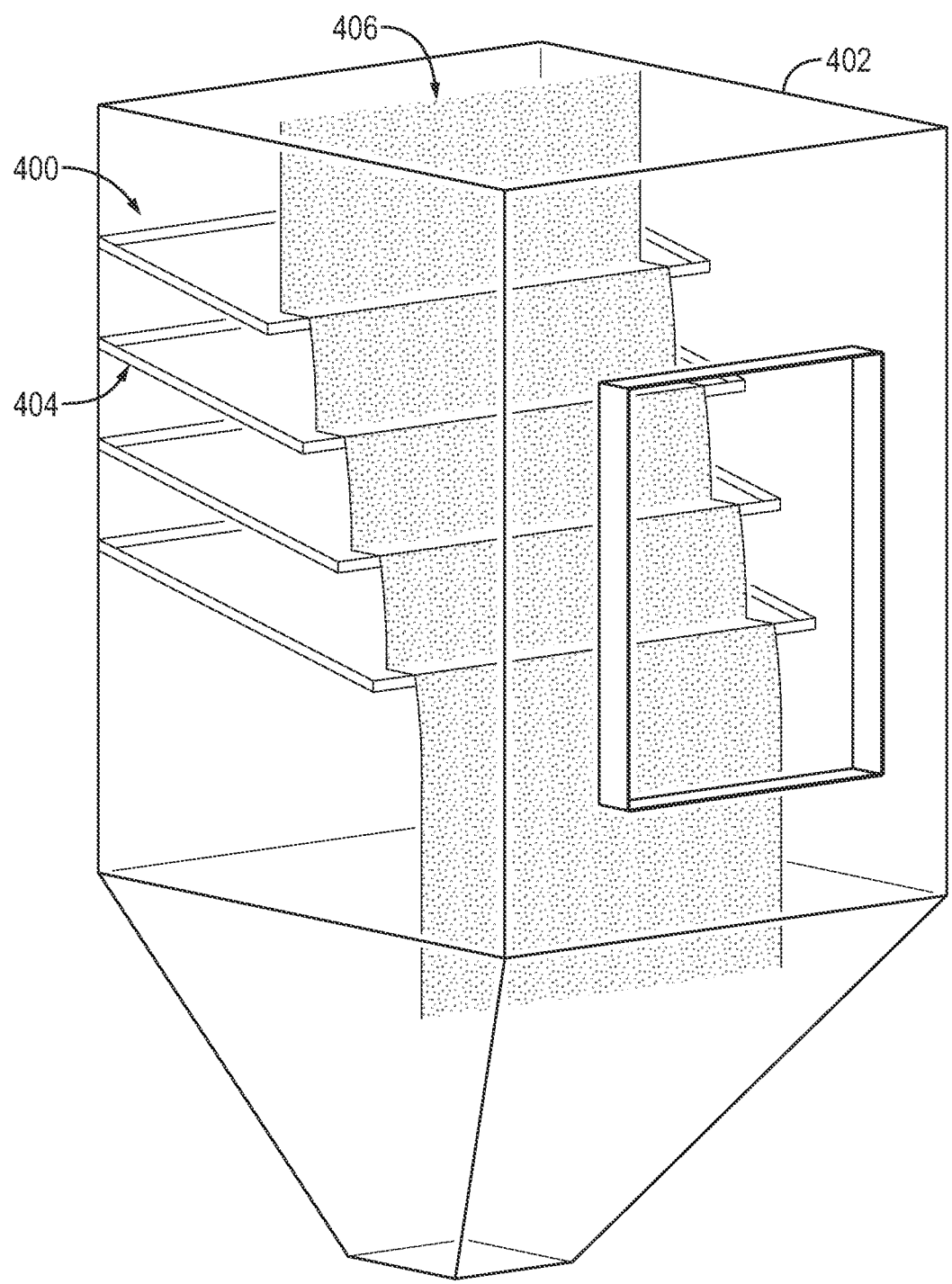
FIG. 4 is a simplified schematic of an embodiment of a flow retarding system disposed within a receiver according to embodiments of the disclosure.

According to another embodiment of the disclosure, the flow retarding system may include one or more flow retarding devices that are inclined planes. FIG. 4 is a simplified schematic of an embodiment of a flow retarding system 400 disposed within a receiver 402. The flow retarding system includes flow retention devices 404 that are planes or ledges that are. In this exemplary embodiment, the ledges are inclined downward from the rear to the front of the receiver 402. In other embodiments, the ledges may be horizontal or inclined downward. In such a manner, falling particles 406 can cascade through the interior of the receiver while being irradiated by concentrated solar irradiance. In this exemplary embodiment, the inclined planes are inclined downward by fifteen degrees. In another embodiment, the inclined planes may be inclined between 0 and less than 90 degrees. The inclined planes minimize unnecessary particle collection.

Figure 5:
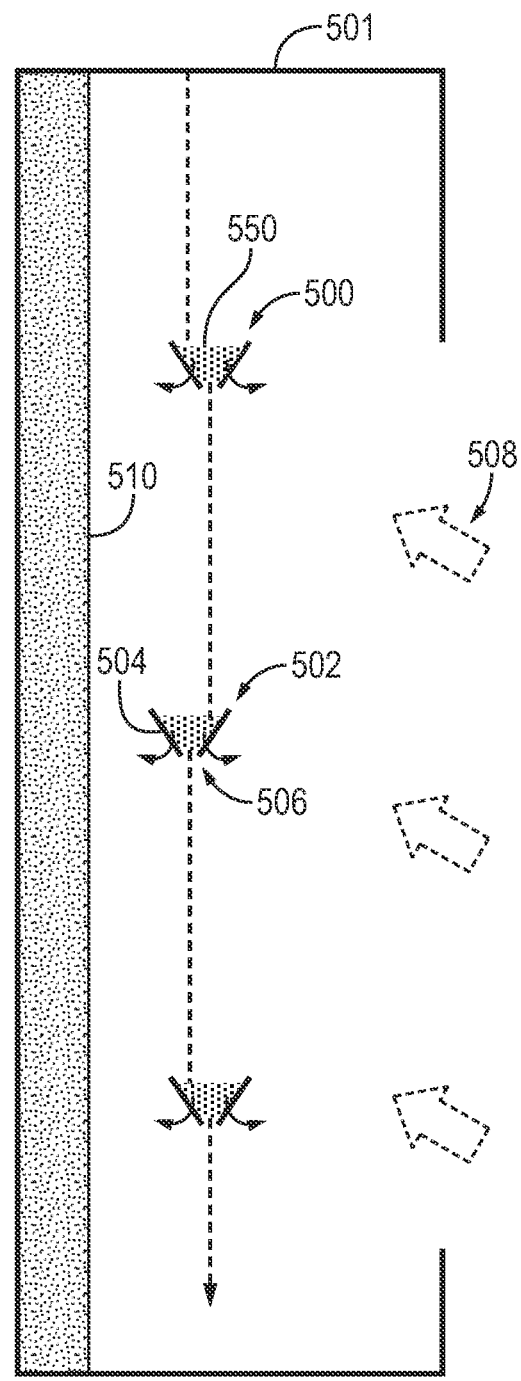
FIG. 5 is a simplified side profile of a multi-stage falling particle receiver with V-shaped troughs.

FIG. 5 illustrates a simplified schematic of a flow retarding system 500 arranged within a solar receiver 501 having a rear wall 510 according to another embodiment of the disclosure. As can be seen in FIG. 5, the flow retarding system 500 includes troughs 502 having a V-shaped profile formed by opposing walls 504 with an aperture or opening 506 at the bottom of the troughs 502. The troughs 502 are installed in series fully exposed to solar irradiance 508. In this exemplary embodiment, the troughs are vertically offset. In other embodiments, the troughs may be vertically alighted. In order to maintain proper particle level to allow efficient retardation and stable release of particles, the trough opening 506 can be controlled actively by an actuator or passively by particle weight in the trough. For example, the troughs may be actively or passively controlled to allow the trough sides to swing as shown by the arrows to increase or decrease the bottom opening size in order to control flow rate and the amount of accumulation of particles 550 (indicated by the mass shown contained within the troughs.

Figure 6:
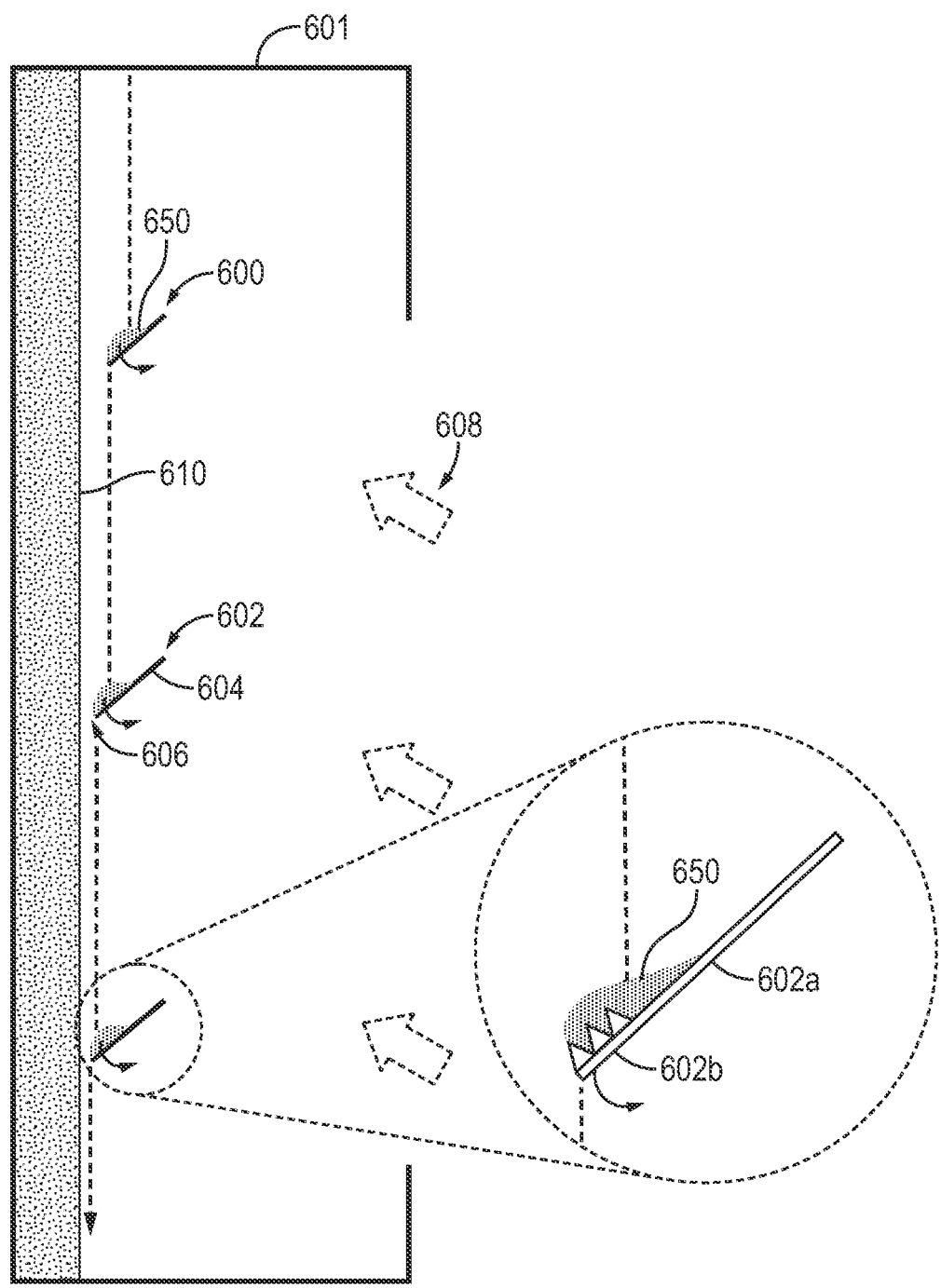
FIG. 6 is a simplified side profile of a multi-stage falling particle receiver with wall-assisted troughs.

FIG. 6 illustrates another simplified schematic of a flow retarding system 600 arranged within a solar receiver 601 having a rear wall 610 according to another embodiment of the disclosure. As can be seen in FIG. 6, the flow retarding system 600 includes ledges 602 inclined or angled downward towards the rear wall 610. The reference system in this and other figures disclosed herein, referring to FIG. 1, is that the direction from the inlet 106 to the outlet 108 is downward. The inclined ledges 602 and rear wall 610 define an opening 606 that allow particles collected on the ledges 602 to flow towards the rear wall 610 and then downward. The inclined ledges 602 may be actively or passively controlled to adjust incline angle and/or distance from the rear wall 610 to control particle flow. The inclined ledges 602 include an inclined flat portion 602a and a barrier portion 602b. The barrier portion 602b includes ridges, walls, or other flow impediments that slow or impede the flow of particles off of the ledges 602. In other embodiments, the ledges 602 may only include an inclined flat portion and no barrier portion. In other embodiments, the inclined ledges 602 may only include a barrier portion and no flat portion. As shown in FIG. 6, the angle of the troughs can be actively or passively increased or decreased as shown by the arrows to control the amount of particles accumulated 650 on the ledges and to control the release or flow rate from the ledges.

Figure 7:
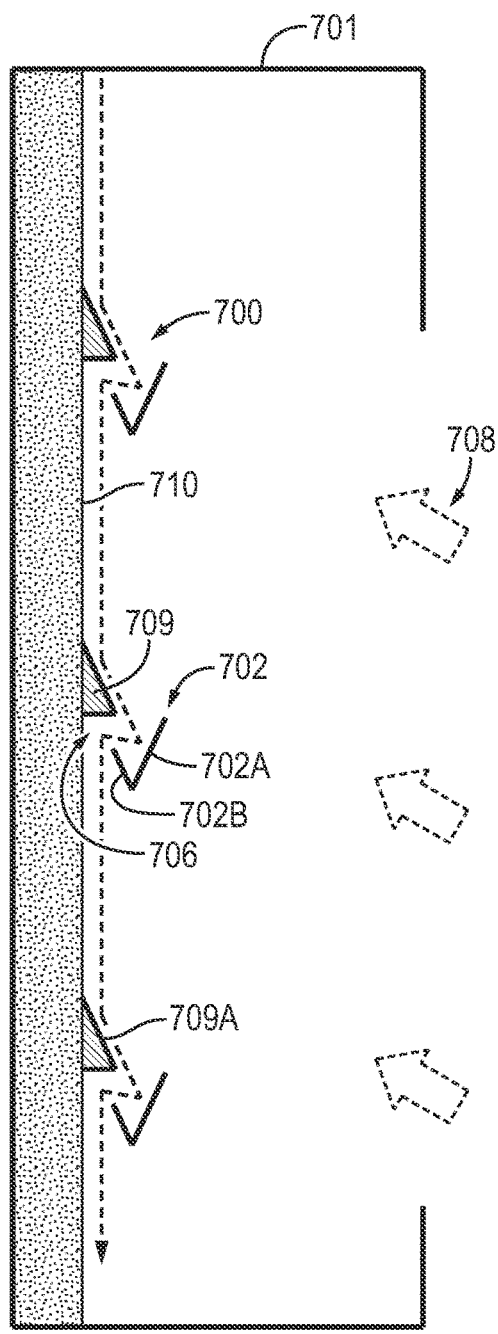
FIG. 7 is a simplified side profile of a multi-stage falling particle receiver with troughs and wall-attached deflectors.

FIG. 7 illustrates another simplified schematic of a flow retarding system 700 arranged within a solar receiver 701 having a rear wall 710 according to another embodiment of the disclosure. As can be seen in FIG. 7, the flow retarding system 700 includes flow diversion structures 709 and corresponding flow retarding devices 702. The flow diversion structures 709 include an inclined surface 709a that divert falling particles downward away from the rear wall 710 and into the flow retarding devices 702. The flow retarding devices 702 have a non-symmetrical V-shaped cross-section including a high side 702a and a lower side 702b that directs particles filling the flow retarding devices 702 towards the rear wall 710. The flow retarding system 700 allows efficient retardation and stable release of particles regardless of particle flow rate without needing an active or passive flow control mechanism in the trough. Direct particle falling through the gap between wall and trough is prevented by deflectors attached to the wall just above each trough. It should be understood that particles fill the space above and contained by the flow retarding devices 702 in a manner that when the space if full, the particles impact contained particles, and may mix, and then particles overflow as shown by the flow represented by the dashed line.

Figure 8:
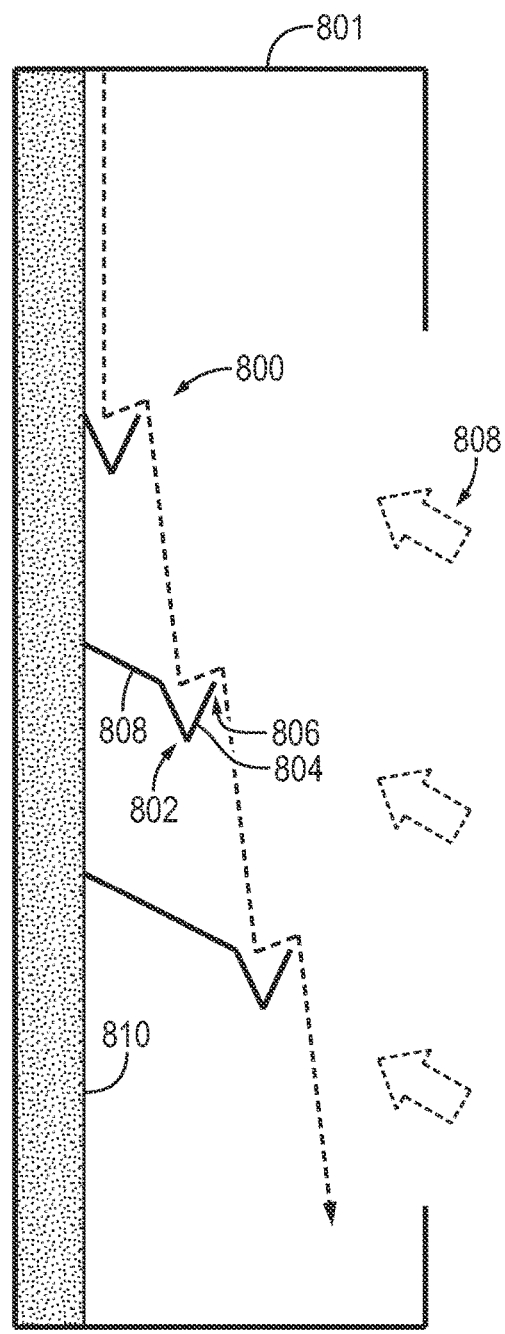
FIG. 8 is a simplified side profile of a multi-stage falling particle receiver with wall mounted troughs.

FIG. 8 illustrates another simplified schematic of a flow retarding system 800 arranged within a solar receiver 801 having a rear wall 810 according to another embodiment of the disclosure. As can be seen in FIG. 8, the flow retarding system 800 includes flow retarding devices 802 configured to release particles in a cascade flow away from the rear wall 810. The flow retarding devices 802 include a trough portion 804 and a mount portion 808 that connects the trough portion 804 to the rear wall 810. The trough portion 804 increases in length as the flow retarding devices 802 progress downward, allowing for particles to cascade. In this exemplary embodiment, the first (numbering from top to bottom) flow retarding device has not mount portion. In other embodiments, the mount portions may start with zero or greater than zero length. In such a manner the flow retarding devices are designed to allow overflowing of particles in the direction of solar energy reception. In this exemplary embodiment, the mount portions are inclined downward in order to minimize unnecessary particle collection. Particles may impact and accumulate over the mount portion 808 and/or trough portion 804. In other embodiments, the mount portions may be horizontal or inclined downward. The flow retarding system provides for efficient retardation and stable release of particles regardless of particle flow rate. An additional benefit of this design is that the troughs and mounts are protected from direct solar irradiance by overflowing particles. The protected trough prevents heat loss from the particles and material damage caused by direct exposure of trough to high flux solar irradiance. It should be understood that particles fill the space above and contained by the flow retarding devices 802 in a manner that when the space if full, the particles impact contained particles, and may mix, and then particles overflow as shown by the flow represented by the dashed line.

Figure 9:
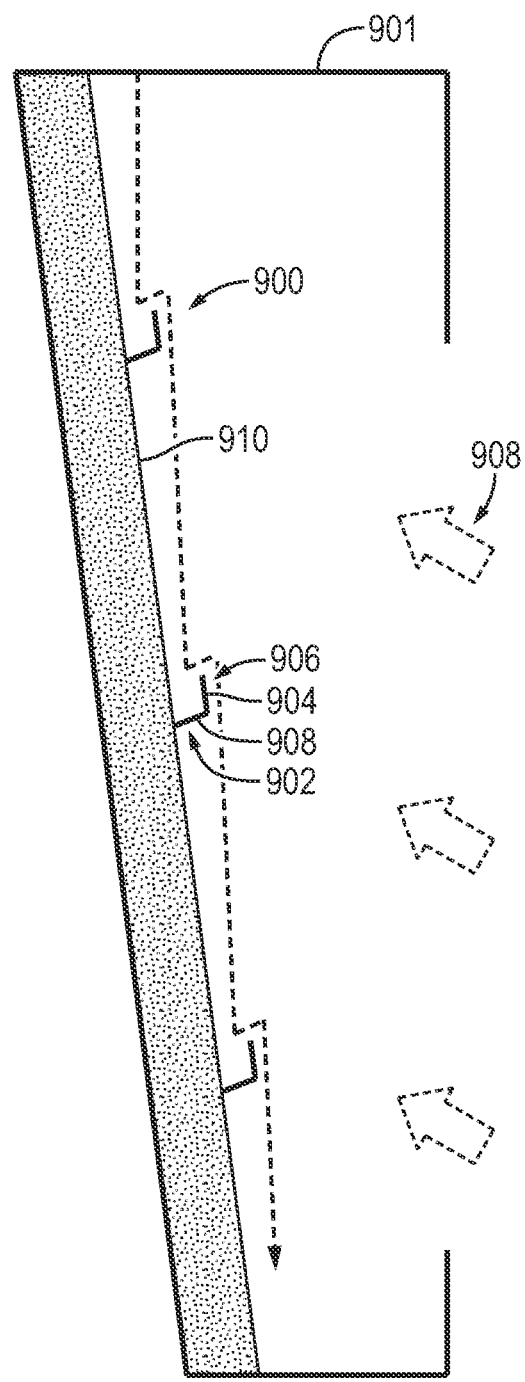
FIG. 9 is a simplified side profile of a multi-stage falling particle receiver with inclined wall and wall-attached troughs.

FIG. 9 illustrates another simplified schematic of a flow retarding system 900 arranged within a solar receiver 901 having a rear wall 910 according to another embodiment of the disclosure. As can be seen in FIG. 9, the flow retarding system 900 includes flow retarding devices 902 configured to release particles in a cascade flow away from the rear wall 910. The flow retarding devices 902 include a retention portion 904 and a mount or base portion 908 that connects the retention portion 904 to the rear wall 910. In this exemplary embodiment, the rear wall 910 is inclined downward towards the direction of incident light, allowing for particles to cascade. In such a manner the flow retarding devices in conjunction with the inclined rear wall are designed to allow overflowing of particles in the direction of solar energy reception that protect the devices from direct solar irradiance. Optimum angle of the rear wall inclination is determined by a combination of particle flow rate and the distance between troughs. It should be understood that particles fill the space above and contained by the flow retarding devices 902 in a manner that when the space if full, the particles impact contained particles, and may mix, and then particles overflow as shown by the flow represented by the dashed line.

The disclosed embodiments include multiple flow retarding devices, however, it should be understood that a flow retarding system may include one or more of one or more of the various embodiments of flow retarding devices.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A solar receiver, comprising:
   a housing comprising at least one opening for receiving concentrated solar irradiance and a front wall and a rear wall; and
   a flow retarding system comprising two or more flow retention devices separated by a vertical distance disposed within the housing for receiving, accumulating and releasing particles as the particles fall through the solar receiver; wherein the particles are impinged by irradiance as the particles flow between the two or more flow retention devices; and
   wherein the particles are impinged by irradiance for the distance separating the two or more flow retention devices.

2. The solar receiver of claim 1, wherein the two or more flow retention devices are selected from a group consisting of troughs and ledges.

3. The solar receiver of claim 2, wherein the two or more flow retention devices are troughs and the troughs are positioned within the housing so that the troughs are not irradiated by concentrated solar irradiance entering the receiver.

4. The solar receiver of claim 2, where the two or more flow retention devices are troughs and the troughs comprise one or more openings for releasing the particles.

5. The solar receiver of claim 4, wherein the two or more openings release particles to a particle outlet at the bottom of the trough.

6. The solar receiver of claim 2, wherein the flow retention devices are troughs and two or more of the troughs are connected to the rear wall by mounts inclined downward away from the rear wall.

7. The solar receiver of claim 2, wherein the flow retention devices are troughs configured to discharge particles away from the rear wall creating a cascade of particles away from the rear wall.

8. The solar receiver of claim 2, wherein the two or more flow retention devices are ledges.

9. The solar receiver of claim 8, wherein the ledges are inclined downward towards irradiance entering the solar receiver creating a cascade of falling particles.

10. The solar receiver of claim 8, wherein the ledges are horizontal.

11. The solar receiver of claim 8, wherein the ledges comprise an inclined portion and a flow barrier portion.

12. The solar receiver of claim 8, where the ledges are configured to direct particle flow downward towards the rear wall.

13. The solar receiver of claim 1, wherein the flow retarding system further comprises a flow directing device inclined attached to the rear wall.

14. The solar receiver of claim 1, wherein the rear wall is inclined downward towards the direction of solar irradiance.

15. The solar receiver of claim 1, wherein two or more of the one or more flow retention devices are actively or passively controlled to adjust particle flow.

16. A falling particle solar heating method, comprising providing particles to a solar receiver; and
   collecting, accumulating and releasing particles in two or more flow retarding devices separated by a vertical distance as the particles fall through the solar receiver and are heated by solar irradiance;
   wherein the solar irradiance impinges the particles as the particles flow between the two or more flow retention devices; and
   wherein the particles are impinged by irradiance for the distance separating the two or more flow retention devices.

17. The method of claim 16, wherein the two or more flow retarding devices are toughs.

18. The method of claim 17, wherein the troughs include openings for discharging collected particles to a bottom outlet.

19. The method of claim 16, wherein the two or more flow retarding devices are ledges.

20. The method of claim 16, wherein the two or more flow retarding devices create a cascade of falling particles.

21. The method of claim 20, wherein the cascade of falling particles protect the two or more flow retarding devices from concentrated solar irradiance entering the solar receiver.

* * * * *